(12) United States Patent
Schrand et al.

(10) Patent No.: US 7,980,983 B2
(45) Date of Patent: Jul. 19, 2011

(54) HYDRAULICALLY LOCKING LIMITED SLIP DIFFERENTIAL

(75) Inventors: Edward V. Schrand, Farmington Hills, MI (US); Charles R. Pajtas, Sterling Heights, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 714 days.

(21) Appl. No.: 12/036,542

(22) Filed: Feb. 25, 2008

(65) Prior Publication Data
US 2009/0215575 A1 Aug. 27, 2009

(51) Int. Cl.
*F16H 48/20* (2006.01)
(52) U.S. Cl. .......................... 475/231; 475/160
(58) Field of Classification Search ................. 475/231, 475/159, 160
See application file for complete search history.

(56) References Cited

U.S. PATENT DOCUMENTS

| 4,966,249 | A | * | 10/1990 | Imaseki | 180/233 |
| 4,966,250 | A | * | 10/1990 | Imaseki | 180/233 |
| 4,979,931 | A | * | 12/1990 | Fleischmann et al. | 475/234 |
| 5,951,426 | A | * | 9/1999 | Forrest | 475/88 |
| 7,294,086 | B2 | * | 11/2007 | Brissenden et al. | 475/231 |
| 7,361,114 | B2 | * | 4/2008 | Boddy | 475/231 |

FOREIGN PATENT DOCUMENTS

JP 02261946 A * 10/1990

* cited by examiner

*Primary Examiner* — Ha D. Ho
(74) *Attorney, Agent, or Firm* — Ralph E. Smith

(57) ABSTRACT

An improved hydraulically locking limited slip differential assembly for a drivetrain of a motor vehicle having a fluid pump external to a differential carrier and arranged for preventing slip between the wheels by selectively pressurizing a differential clutch internal to the carrier, and a controller arranged for selectively activating the fluid pump.

8 Claims, 5 Drawing Sheets

HYDRAULICALLY LOCKING LIMITED SLIP DIFFERENTIAL

FIELD OF THE INVENTION

The present invention relates to limited slip differentials, and, more particularly, to an improved hydraulically locking limited slip differential for a motor vehicle.

BACKGROUND OF THE INVENTION

Four-wheel and all-wheel drive vehicles are popular for their enhanced capabilities in inclement weather and off-highway conditions as compared with two-wheel drive vehicles. In order to further boost these capabilities, modern four-wheel and all-wheel drive vehicles frequently employ a limited slip differential (LSD) between two respective rear axle-shafts in place of a more common open type differential. Some high performance four-wheel and all-wheel drive vehicles employ a limited slip differential in the front axle, as well, while others go a step further in utilizing a centrally located limited slip differential, i.e. between the axles.

By limiting the velocity difference between a pair of wheels driven by their respective axle half-shafts, an LSD can transmit useful torque as long as there is some friction available at the interface between the ground and at least one of the driven wheels. Limited slip differentials couple, i.e. operationally lock, the respective axle half-shafts when the difference in the axle-shafts' rotational velocity rises above a certain preset value. Two main types of limited slip differentials are used on motor vehicles. One type is torque sensitive, which is usually either geared or clutch-pack based, and the other type is speed sensitive, which is mainly viscous or pump and clutch-pack based. Speed sensitive limited slip differentials generally have been more popular than the torque sensitive types because they are mechanically less complex and tend to require less maintenance.

Pump and clutch-pack speed sensitive LSDs generally utilize a pump, typically a gerotor, for hydraulically compressing the clutch pack. When driving conditions produce a difference in wheel rotation, the pump pressurizes its working fluid into the clutch pack area, which provides a clamp load for frictional resistance to couple the two respective axle half-shafts and thereby transfer torque to the wheel with higher traction.

However, additional pump and clutch-pack related components collectively result in a relatively large LSD assembly which can cause packaging issues as attempts are made to package current four-wheel and all-wheel drive technology into smaller vehicles. The additional components also tend to increase parasitic drag inside the LSD assembly, which may have a considerable negative impact on the vehicle's fuel efficiency.

In view of the above, an improved hydraulically locking limited slip differential with hydraulic locking capability and fewer internal components would be most beneficial in designing smaller vehicles.

SUMMARY OF THE INVENTION

The present invention is an improved hydraulically locking limited slip differential (LSD) assembly for a motor vehicle. The limited slip differential assembly comprises a housing, a carrier positioned inside the housing for supporting components of the differential, a gear-set arranged for rotation inside the carrier to drive the wheels of a motor vehicle, a clutch positioned between the gear-set and the wheels for preventing slip between driven wheels, and a pressure chamber arranged inside the carrier for selectively engaging the clutch. According to the invention, the LSD assembly includes a fluid pump located externally from the carrier, and stationary relative to the housing. The pump is in fluid communication with the pressure chamber via a fluid pathway and is arranged for selectively engaging the clutch via fluid pressure applied in response to signals received from an externally located controller.

In a preferred embodiment, the present invention provides a pump located externally from the differential housing to thereby provide a more compact LSD with a shorter span between carrier support bearings at the interface between the housing and the carrier than in typical limited slip differentials. The fluid pathway for selective engagement of the clutch may be conveniently positioned beneath one of the carrier support bearings.

A high-pressure dynamic seal may be required at the interface between the rotating differential carrier and the stationary pump. Typically, high-pressure dynamic seals generate considerable rotating friction which results in parasitic losses and reduced vehicle fuel efficiency. Such parasitic losses grow in proportion to the seal's contact diameter. By moving the pump outside the rotating differential carrier, the carrier-to-pump interface diameter, and, therefore the corresponding seal diameter, may be reduced without increasing the span between the support bearings. So reduced, the seal contact diameter according to the invention will reduce parasitic losses as compared with other limited slip differential designs/configurations.

It should be understood that the detailed description and specific examples which follow, while indicating preferred embodiments of the invention, are intended for purposes of illustration only and are not intended to limit the scope of the invention.

DETAILED DESCRIPTION

Figure 1:
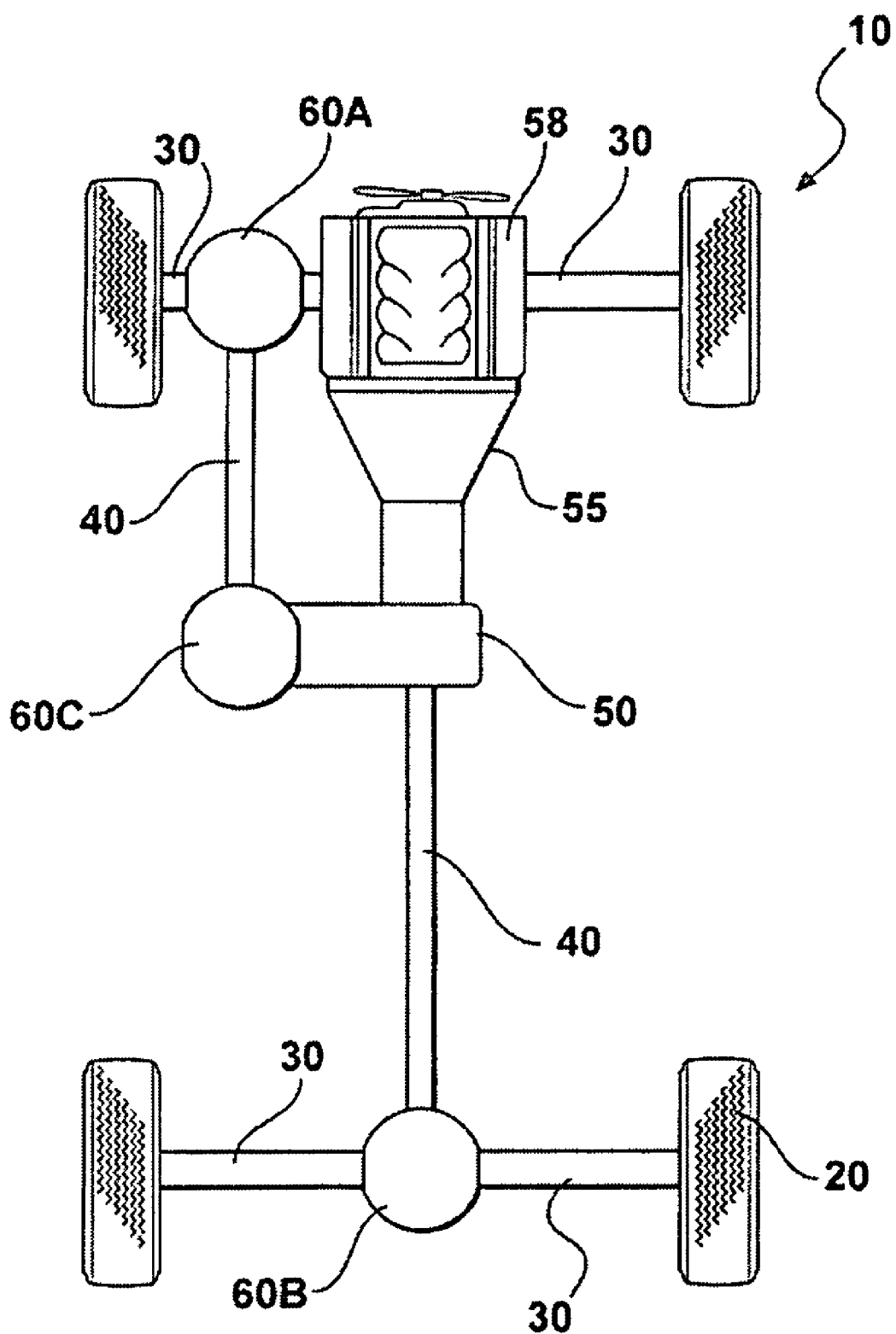
FIG. 1 is a schematic diagram of a typical four-wheel drive motor vehicle drivetrain according to the prior art.

In general the present invention is directed to a limited slip differential, and, more particularly, to an improved hydraulically locking limited slip differential (LSD) for a motor vehicle. Limited slip differentials are frequently chosen for various vehicle drivelines in place of open type differentials to transfer torque from a slipping drive wheel to one with more grip and thereby improve the vehicle's overall traction capability.

Each motor vehicle design typically results in unique vehicle traction capabilities, influenced in part by a threshold traction loss at one or more wheels. A threshold traction loss is generally signified by a detectable minimum difference in rotational speed of one of the driven wheels vs. others. The minimum wheel speed difference may be predetermined, i.e. established empirically, during the vehicle development phase under controlled conditions at an instrumented test-facility. A development vehicle may be run on various driving surfaces and the optimal point of LSD clutch engagement for acceptable vehicle performance can be identified and noted.

Wheel speeds may be detected in the vehicle real-time by sensors positioned at the individual wheels. The sensors communicate with a processor which operates to compare sensed wheel speed against a predetermined minimum wheel speed difference. In response to a detected threshold wheel traction loss, a determination whether the wheel speed difference is above the predetermined minimum is made by a controller. In situations when the difference between the detected wheel speeds is greater than the predetermined minimum, such as when at least one drive wheel loses traction, a pump is activated to pressurize its working fluid and engage the LSD clutch. The clutch couples, i.e. operationally locks, the differential gear-set to the differential carrier in response to the high pressure fluid compressing the clutch, thereby forcing the gear-set and the carrier to rotate as a unit. The relative speeds of the drive wheels then equalize i.e. slip between the wheels is restricted, and traction is restored.

When a driven wheel slips the torque transmitted through its respective axle-shaft declines. Hence, a threshold traction loss may also be signified by a detectable minimum difference in the amount of torque transmitted through the driven wheel axle-shafts. The minimum difference in the axle-shaft torques that is indicative of the threshold traction loss may be predetermined during the vehicle development phase. In the vehicle, axle-shaft torques may be detected real-time via purposefully configured strain gauges incorporated into the axle-shaft structure. The strain gauges communicate with a processor, and the processor compares sensed torque values against a predetermined minimum axle-shaft torque difference. A determination whether the actual axle-shaft torque difference is above the predetermined minimum value is made by a controller. When traction loss is detected in the foregoing manner, the controller directs the pump to pressurize its working fluid and engage the LSD clutch.

Referring now to the drawings in which like elements of the invention are identified with identical reference numerals throughout, FIG. 1 denotes a diagram of a drivetrain 10 of a typical four-wheel drive motor vehicle. Drive wheels 20 are connected via axle half-shafts 30 to front differential 60A and to rear differential 60B, and via driveshafts 40 to differential 60C mounted inside transfer case 50. Engine 58 generates torque which it transfers to transmission 55. Transfer case 50 receives torque from transmission 55 and distributes it in the drivetrain. Each of the differentials 60A, 60B and 60C may be configured either as limited slip or open type.

Figure 2:
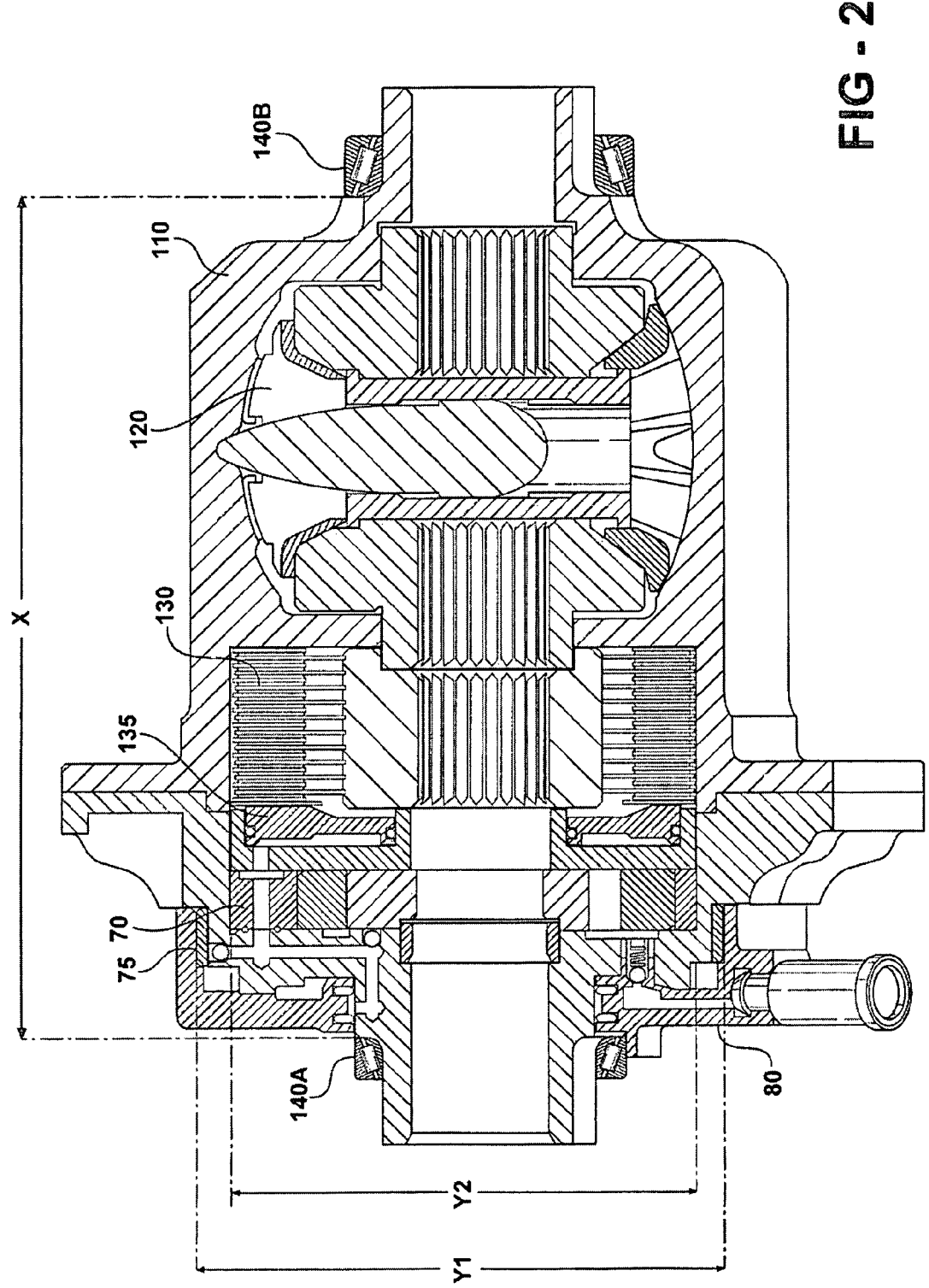
FIG. 2 is a cross-sectional side view of the limited slip differential assembly according to prior art.

FIG. 2 denotes a typical limited slip differential with gerotor fluid pump 70 internal to the differential according to prior art. Gerotor pump 70 is positioned inside the differential adjacent piston 135 to transfer torque from a slipping drive wheel to one with more grip by locking differential carrier 110 to gear-set 120. Fluid inlet structure 80 delivers a working fluid to gerotor pump 70. Gerotor pump 70 is driven by either driveshaft 40 or axle half-shaft 30 to apply pressurized working fluid against piston 135. Piston 135, in turn, applies a clamping force to clutch assembly 130. Two critical dimensional characteristics of a differential are span between support bearings 140A and 140B, labeled X, and diameter of high-pressure dynamic seal 75, which is positioned at the rotational interface between fluid inlet 80 and differential carrier 110, labeled Y1. Typically, vehicle packaging requirements for a differential of the type shown in FIG. 2 demand a compromise between reducing span X and reducing diameter Y1. In situations where packaging drives a desire for, lengthwise, a more compact differential, a design with diameter Y1 that is larger than gerotor pump's outer diameter Y2 is typically chosen. Such a solution, most often, elects a shorter differential assembly at the expense of higher parasitic losses, e.g. from a larger rotational interface diameter at the high-pressure seal.

Figure 3:
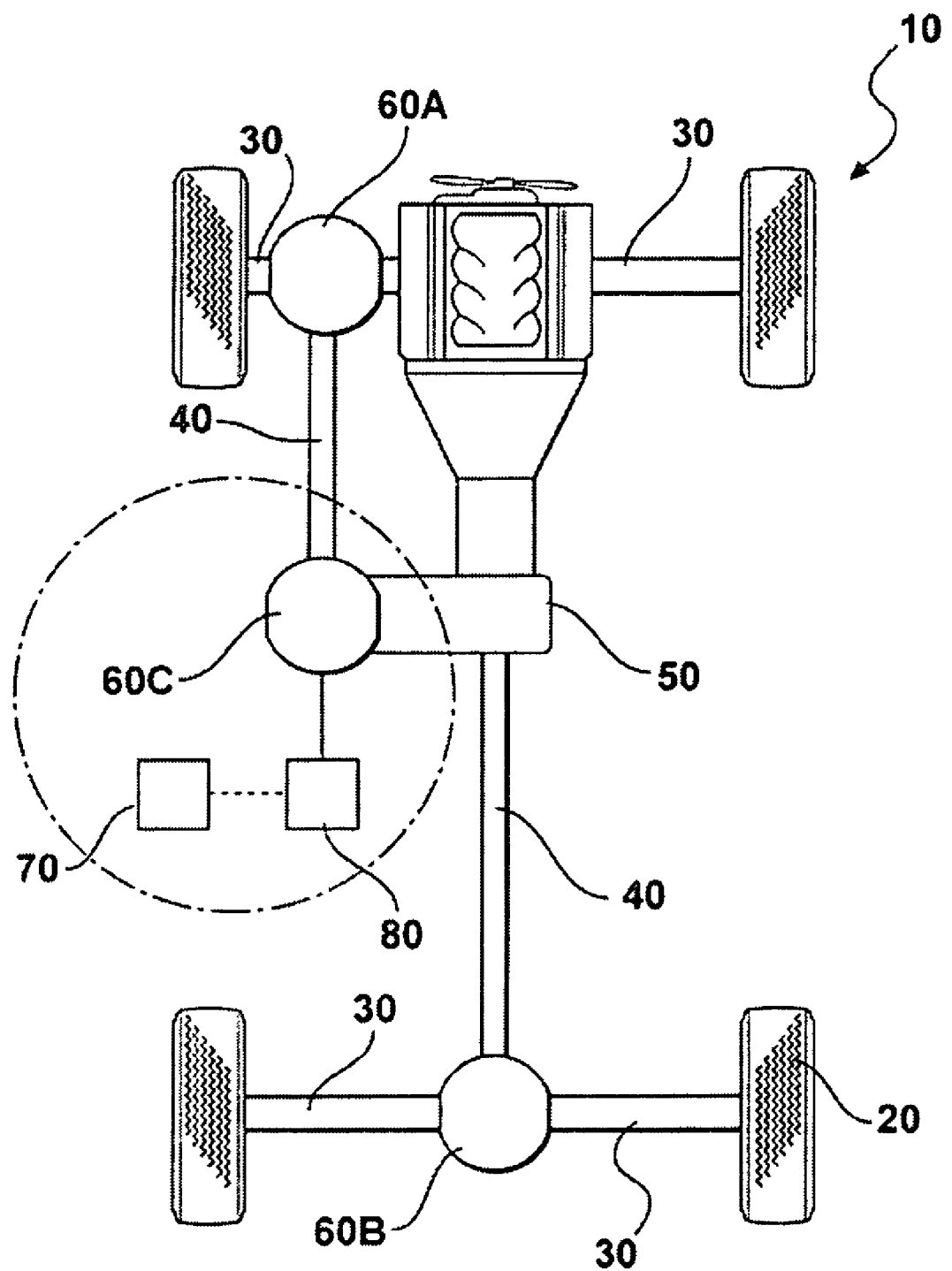
FIG. 3 is a schematic diagram of a four-wheel drive motor vehicle drivetrain with a hydraulically locking limited slip differential assembly according to the invention.
Figure 4:
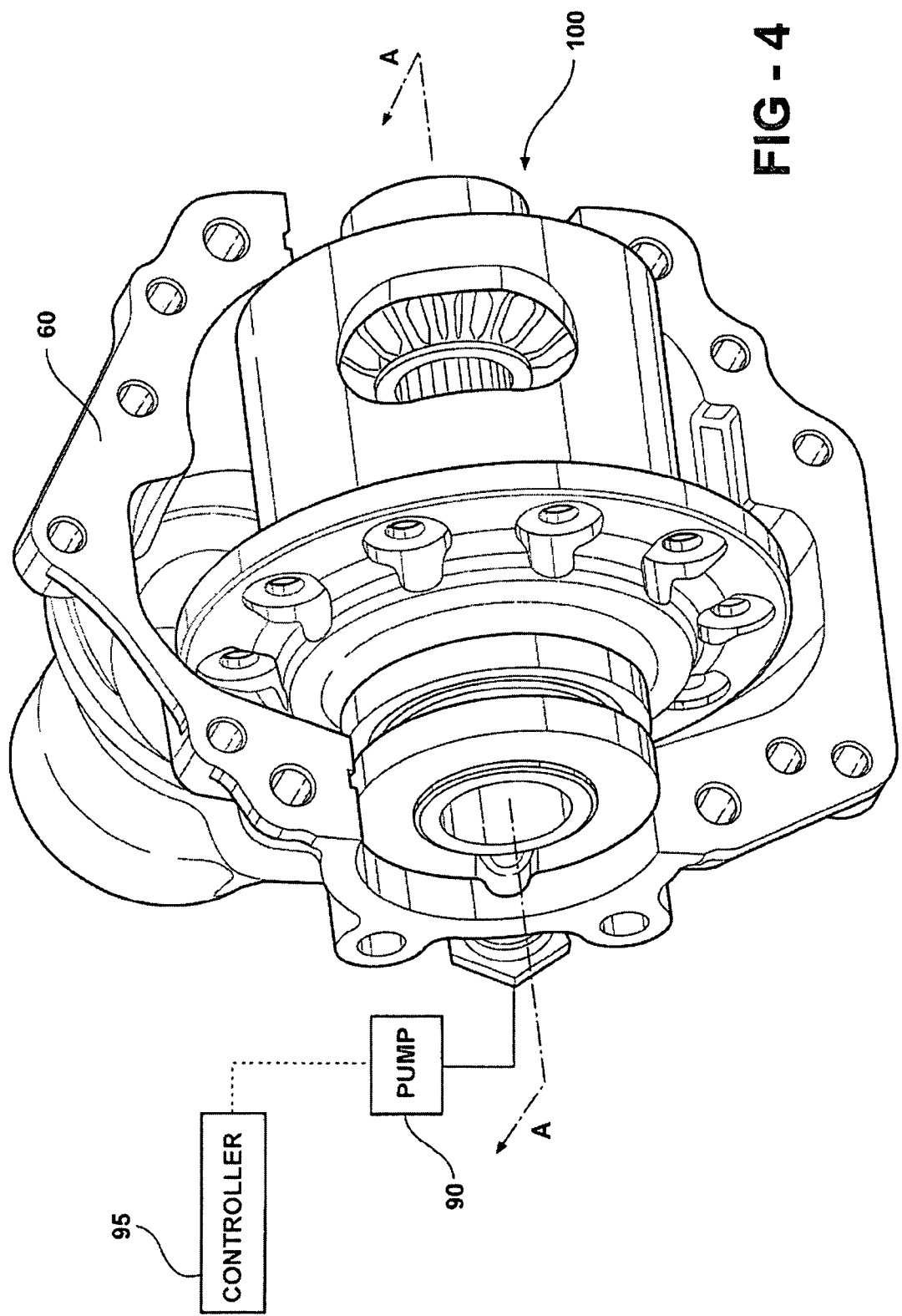
FIG. 4 is an isometric perspective view of the hydraulically locking limited slip differential assembly having the differential mounted inside a housing and a schematically shown external pump and a controller according to the invention.
Figure 5:
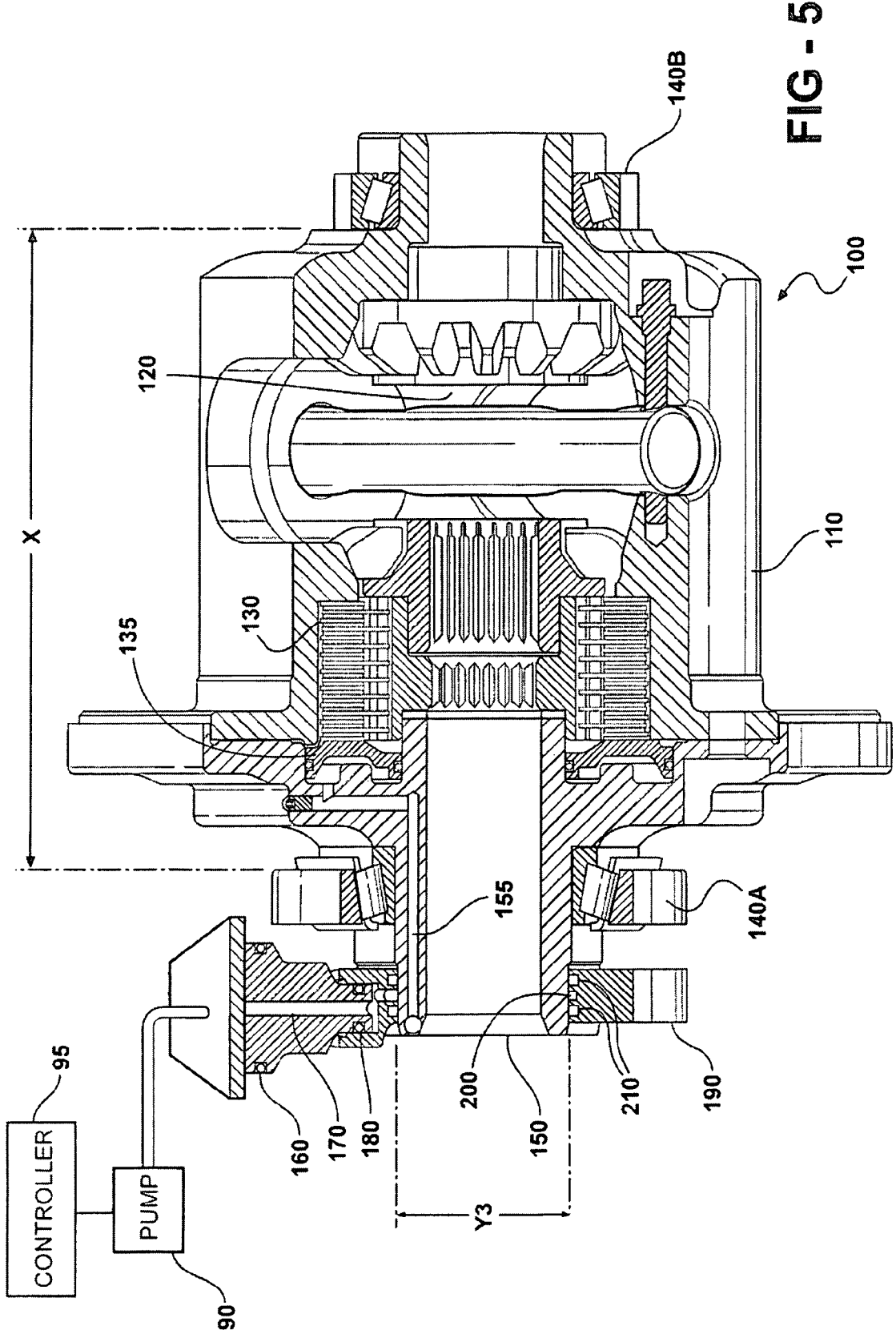
FIG. 5 is a cross-sectional side view taken along line A-A of the limited slip differential assembly shown in FIG. 4.

FIGS. 3-5 denote hydraulically locking limited slip differential assembly 100 according to the invention. FIG. 3 denotes a diagram of a four-wheel drive motor vehicle drivetrain with a hydraulically locking limited slip differential assembly 100 where differential 60C is shown as a limited slip differential mounted inside transfer case 50. Differential 60C is in fluid communication with external fluid pump 90. Pump 90 is in electrical communication with controller 95, which activates the pump in response to threshold traction loss detected at wheels 20.

As shown in FIG. 4, hydraulically locking limited slip differential assembly 100 has the differential mounted for rotation inside housing 60. Fluid pump 90 and controller 95 are mounted on the vehicle external to differential carrier 110. Differential carrier 110 may be made from aluminum, or a similarly high strength, temperature resistant and hermetically sealable synthetic material. As shown in FIG. 5, gear-set 120 and clutch pack 130 adjacent to the gear-set are mounted driveably inside carrier 110. Clutch pack 130 has generally annular individual friction plates which are arranged as a plurality of complementary plate pairs, where in each adjoining pair one friction plate is slidably engaged with carrier 110 and the other is slidably engaged with gear-set 120 (not shown). Annular piston 135 is mounted slidably inside carrier 110 adjacent to clutch pack 130.

Pump 90 is activated in response to a signal generated by controller 95 to compress clutch pack 130 and couple gear-set 120 to differential carrier 110. Pump 90 delivers a high-pressure fluid to carrier 110 via connector 160. Connector 160, which may be made from an engineering plastic or a similarly heat and oil resistant material, has an internal fluid passage 170 and includes a heat and oil resistant o-ring seal 180. Connector 160 is inserted into plenum 190, which is stationary relative to housing 60, and is hermetically sealed against the plenum with seal 180. Thus inserted, connector 160 is in fluid communication with fluid pathway 155 running inside bearing trunion 150, which is part of carrier 110, and under support bearing 140A. The high-pressure fluid is delivered to fluid pathway 155 via channel 200 located on inner diameter of plenum 190. Channel 200 is hermetically sealed against bearing trunion 150 via a pair of high-pressure dynamic seals 210 at diameter Y3. As such, rotating interface diameter Y3 is measurably smaller than the functionally comparable interface diameter Y1 of the prior art.

Mounting a fluid pump on the vehicle externally to the differential the invention effectively addresses the typical compromise of the prior art. The invention concurrently minimizes span X between support bearings 140A and 140B, and high-pressure dynamic seal diameter Y3 at the stationary pump fluid inlet and rotating differential carrier 110 interface. The result is a hydraulically locking limited slip differential which at once achieves a more compact length and reduced parasitic losses relative to prior art designs utilizing an internal gerotor pump.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An improved hydraulically locking limited slip differential assembly for a drivetrain of a motor vehicle comprising:
   i) a housing for retaining a limited slip differential;
   ii) the limited slip differential arranged rotatably inside the housing, having a carrier for supporting components of the differential, the components comprising a differential gear-set arranged inside the carrier for driving wheels of the motor vehicle, a clutch arranged inside the carrier for preventing slip between the wheels, and a pressure chamber arranged inside the carrier for selectively engaging the clutch;
   iii) a fluid pump arranged external to the carrier, stationary relative to the housing and in fluid communication with the pressure chamber via a fluid pathway for selectively engaging the clutch;
   iv) a controller arranged external to the carrier for selectively activating the fluid pump in response to detected slip between the wheels; and
   v) at least two support bearings, wherein at least one support bearing is arranged at an interface between the carrier and the housing, the fluid pathway extending across and under the at least one support bearing between the bore of the bearing and the bore centerline.

2. The limited slip differential assembly of claim 1 further comprising an annular plenum for attaching to the pump arranged rotatably on the carrier and having a circumferential pocket in fluid communication with the fluid pathway.

3. The limited slip differential assembly of claim 2 further comprising at least one high-pressure dynamic seal between the plenum pocket and the carrier.

4. The limited slip differential assembly of claim 1 wherein the pump is arranged external to the housing.

5. A motor vehicle having an improved hydraulically locking limited slip differential assembly comprising:
   a. a housing for retaining a limited slip differential;
   b. the limited slip differential arranged rotatably inside the housing, having a carrier for supporting components of the differential, the components comprising a differential gear-set arranged inside the carrier for driving wheels of the motor vehicle, a clutch arranged inside the carrier for preventing slip between the wheels, and a pressure chamber arranged inside the carrier for selectively engaging the clutch;
   c. a fluid pump arranged external to the carrier, stationary relative to the housing and in fluid communication with the pressure chamber via a fluid pathway for selectively engaging the clutch;
   d. a controller arranged external to the carrier for selectively activating the fluid pump in response to detected slip between the wheels; and
   e. at least two support bearings, wherein at least one support bearing is arranged at an interface between the carrier and the housing, the fluid pathway extending across and under the at least one support bearing between the bore of the bearing and the bore centerline.

6. The limited slip differential assembly of claim 5 further comprising an annular plenum for attaching to the pump arranged rotatably on the carrier and having a circumferential pocket in fluid communication with the fluid pathway.

7. The limited slip differential assembly of claim 6 further comprising at least one high-pressure dynamic seal between the plenum pocket and the carrier.

8. The limited slip differential assembly of claim 5 wherein the pump is arranged external to the housing.

* * * * *